US009541220B2

(12) United States Patent
Critsinelis et al.

(10) Patent No.: US 9,541,220 B2
(45) Date of Patent: Jan. 10, 2017

(54) CONDUIT DISPLACEMENT MITIGATION APPARATUS INCLUDING SPRINGS, METHODS AND SYSTEMS FOR USE WITH SUBSEA CONDUITS

(71) Applicants: Antonio Carlos Falcao Critsinelis, Kingwood, TX (US); Sid Ahmed Mebarkia, Sugar Land, TX (US); Daniel Christopher Kefford, Kingsley (AU); Daria Igorevna Bougai, Cypress, TX (US); Dane Ryne Drew, Houston, TX (US)

(72) Inventors: Antonio Carlos Falcao Critsinelis, Kingwood, TX (US); Sid Ahmed Mebarkia, Sugar Land, TX (US); Daniel Christopher Kefford, Kingsley (AU); Daria Igorevna Bougai, Cypress, TX (US); Dane Ryne Drew, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 14/668,113

(22) Filed: Mar. 25, 2015

(65) Prior Publication Data
US 2015/0198265 A1    Jul. 16, 2015

Related U.S. Application Data

(62) Division of application No. 13/572,907, filed on Aug. 13, 2012.

(51) Int. Cl.
*F16L 1/20* (2006.01)
*F16L 55/02* (2006.01)
(Continued)

(52) U.S. Cl.
CPC .............. *F16L 1/123* (2013.01); *B63B 21/26* (2013.01); *F16L 1/16* (2013.01); *F16L 1/20* (2013.01);
(Continued)

(58) Field of Classification Search
CPC .............. F16L 1/16; F16L 1/20; F16L 1/24; F16L 1/123; F16L 3/02; B63B 21/26; B63B 2021/262
(Continued)

(56) References Cited

U.S. PATENT DOCUMENTS 3,749,168 A * 7/1973 Hall, Sr. .................... 166/241.7
3,786,379 A * 1/1974 Lutchansky ................. 333/248
(Continued)

FOREIGN PATENT DOCUMENTS

EP            466219 A        1/1992
GB            2137721        10/1984
(Continued)

OTHER PUBLICATIONS

U.S. Appl. No. 13/572,899, filed Aug. 13, 2012.
U.S. Appl. No. 13/572,907, filed Aug. 13, 2012.

*Primary Examiner* — Benjamin Fiorello
*Assistant Examiner* — Stacey Warren
(74) *Attorney, Agent, or Firm* — Karen R. DiDomenicis

(57) ABSTRACT

Disclosed are apparatus, systems and methods for reducing displacement of a subsea conduit such as offshore hydrocarbon production pipeline, also referred to as pipeline walking or buckling, thus reducing the need for expensive pipeline anchoring or other mitigation solutions. A movement resistor adapted to be installed on a subsea conduit is provided having an inner portion adapted to receive and securely attach to a subsea conduit and at least one resistor portion adapted to resist induced forces. The at least one
(Continued)

resistor portion includes a spring element therein. At least one movement resistor can be installed along the length of a subsea conduit.

16 Claims, 10 Drawing Sheets

(51) Int. Cl.
*F16L 1/12* (2006.01)
*F16L 3/02* (2006.01)
*B63B 21/26* (2006.01)
*F16L 1/16* (2006.01)
*F16L 1/24* (2006.01)

(52) U.S. Cl.
CPC .. *F16L 1/24* (2013.01); *F16L 3/02* (2013.01); *F16L 55/02* (2013.01); *B63B 2021/262* (2013.01); *Y10T 29/49826* (2015.01); *Y10T 156/10* (2015.01)

(58) Field of Classification Search
USPC ............... 405/157, 168.1, 168.2, 172, 184.4, 211,405/216, 224, 224.2
See application file for complete search history.

(56) References Cited

U.S. PATENT DOCUMENTS

| | | | |
|---|---|---|---|
| 5,683,204 A * | 11/1997 | Lawther | ......................... 405/171 |
| 5,711,639 A * | 1/1998 | Tessier et al. | ................. 405/171 |
| 8,011,856 B2 | 9/2011 | Nock | |
| 2006/0045408 A1* | 3/2006 | Jones et al. | ...................... 385/12 |
| 2007/0125546 A1 | 6/2007 | Allen et al. | |
| 2008/0286052 A1* | 11/2008 | Courbis | ..................... 405/184.4 |
| 2009/0202305 A1 | 8/2009 | Bastard et al. | |

FOREIGN PATENT DOCUMENTS

| | | |
|---|---|---|
| GB | 2423507 | 8/2006 |
| WO | WO 2004083704 | 9/2004 |

* cited by examiner

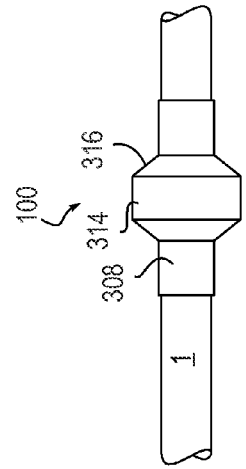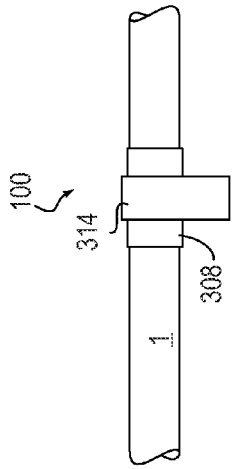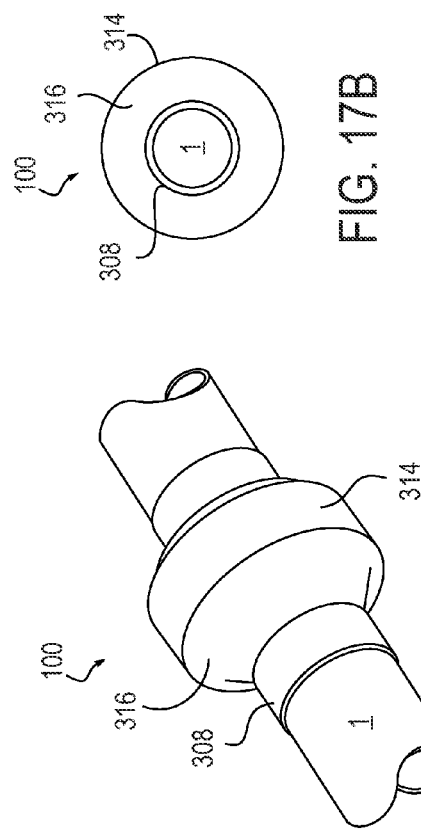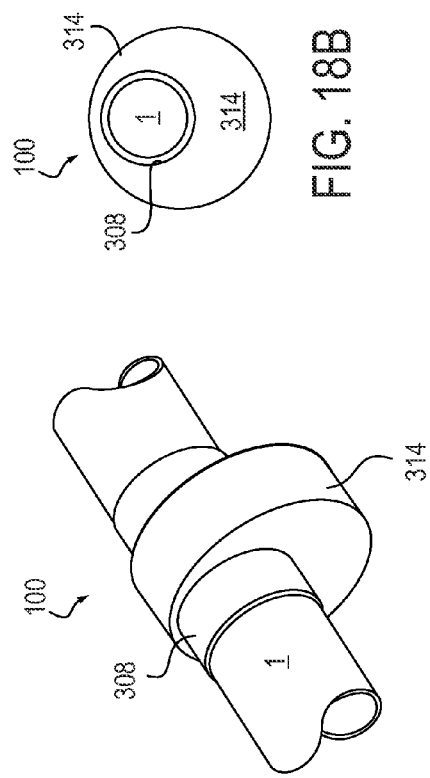

CONDUIT DISPLACEMENT MITIGATION APPARATUS INCLUDING SPRINGS, METHODS AND SYSTEMS FOR USE WITH SUBSEA CONDUITS

FIELD

The present disclosure relates to systems and methods for reducing or modifying displacement in subsea conduit such as offshore hydrocarbon production pipeline. The present disclosure further relates to displacement mitigation apparatus including springs therein for installation on subsea conduits.

BACKGROUND

Pipeline in offshore hydrocarbon production is installed on the seabed, often extending great distances. Hydrocarbon fluids carried by such pipelines can occur over a wide range of temperatures, e.g., between about 4° C. and about 200° C. Pipeline carrying such hydrocarbon fluids can experience thermal gradients across the pipeline during multiple production shut down and start up cycles resulting in expansion, contraction, and thermal cycling of the pipeline or conduit. This can result in pipeline buckling and movement, also referred to as "walking," which may induce overstrain and fatigue failures along the length of the pipeline at locations which are relatively vulnerable and prone to these failure mechanisms. Walking is a very costly problem, as the junction of the pipeline with elements of the production facility infrastructure, such as for example, the pipeline end termination (PLET) or other subsea equipment, can be overstressed, resulting in damage and even parting of the pipeline from the equipment. Such incidents often require that hydrocarbon production be shut down so that the pipeline system can be repaired. In order to prevent walking, expensive anchoring mitigation using large suction or driven piles and the like is often employed to hold the pipeline in place.

It would be desirable to have an economical solution to the aforementioned problems which would reduce the incidence of pipeline walking and buckling, and thus reduce the need for expensive pipeline anchoring or other mitigation solutions.

SUMMARY

In one aspect, a movement resistor adapted to be installed on a subsea conduit for mitigating conduit displacement is provided. The apparatus includes a sleeve having two ends, a sleeve diameter and an inner sleeve surface adapted to receive and securely attach to the subsea conduit. At least one resistor portion having a cross-sectional shape for resisting a force applied thereto is attached to and extends radially from the sleeve. The at least one resistor portion includes at least one spring therein.

In another aspect, a method for controlling displacement of a subsea conduit located on a seabed is provided. The method includes installing at least one movement resistor on the subsea conduit.

DESCRIPTION OF THE DRAWINGS

These and other objects, features and advantages of the present invention will become better understood with reference to the following description, appended claims and accompanying drawings where:

FIGS. 17A-C are perspective, end and side views, respectively, illustrating another exemplary movement resistor.
FIGS. 18A-C are perspective, end and side views, respectively, illustrating another exemplary movement resistor.

DETAILED DESCRIPTION

The present disclosure provides apparatus, systems and methods to be described in detail hereinafter for reducing displacement, such as displacement in the axial and/or lateral direction of a subsea pipeline, by which is meant a conduit located on a seabed. The terms "conduit," "pipeline" and "pipe" are used herein interchangeably.

Figure 1:
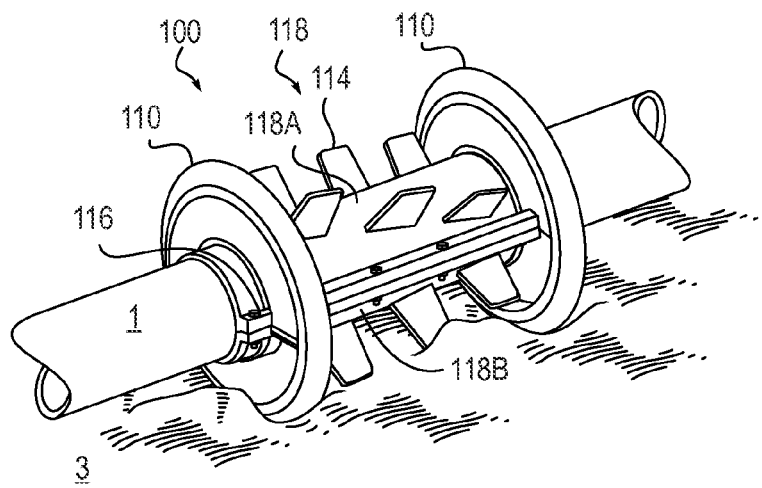
FIG. 1 is an illustration of one exemplary movement resistor.

FIG. 1 illustrates one embodiment of a movement resistor 100 installed on a conduit 1 located on the seabed 3. In this embodiment, the movement resistor 100 includes two sleeve portions 118A and 118B which attach to one another to form an inner portion 118 also referred to as a sleeve 118 having an inner surface to receive and securely attach to the conduit 1. In the embodiment illustrated, the sleeve portions attach to one another using bolts 116. The sleeve 118 generally acts as a means for attaching the movement resistor 100 to the conduit 1. The embodiment shown merely illustrates one means of attaching the movement resistor 100 to the conduit 1. In some embodiments, the movement resistor includes at least two elements attachable to one another using at least one of a clamp, a circumferential band, a hinge mechanism, polymer material, and a bolt. In some embodiments, the movement resistor is installed by bonding the inner surface of the movement resistor to the conduit. In yet other embodiments, the movement resistor is welded to or forged with the conduit. In yet other embodiments, the movement resistor is integral to the field joint coating of the conduit. The movement resistor can be attached to a previously existing element attached or integral to the pipeline such as a collar, J-lay collar, or buckle arrestor. Other attachment means will be apparent to those skilled in the art.

Two resistor portions 110 extend outward from the sleeve 118 and are attached to each of the two ends of the sleeve. The resistor portions 110 have a diameter larger than the diameter of the sleeve. The resistor portions 110 of the movement resistor 100 are adapted to resist forces applied to the resistor portions of the conduit 1. Force applied on the conduit is also referred to as "induced force." The resistor portions 110 are securely attached so that they remain in place when loaded with the induced force. The resistor portions 110 are formed of a rigid material capable of withstanding the induced force without deformation. For example, the rigid material can include steel, alloys, engineered polymers and the like.

The cross-sectional shape of the resistor portions 110 is illustrated as circular, but other cross-sectional shapes can also be used. Suitable cross-sectional shapes of the resistor portion 110 include ellipses including circles, polygons, partial ellipses, partial polygons and combinations thereof. By "ellipse" is meant a closed shape defined by the intersection of a theoretical plane with a theoretical cone. By "polygon" is meant a closed shape defined by a finite number of intersecting edges or sides.

The effective diameter of the resistor portions 110 is greater than the diameter of the sleeve 118, in other words, an outer diameter of a circumscribed circle intersecting the cross-sectional shape of the resistor portion 110 is greater than the diameter of the sleeve 118.

In some embodiments, such as that illustrated in FIG. 1, optional fins 114 may be provided on the sleeve. In the embodiment shown, the fins 114 protrude radially from the sleeve. In one embodiment, the effective diameter of the resistor portions 110 is at least as great as the fin length. The fins can function to engage with the adjacent soil and assist with resistance of the device to induced force. The number and shape of the fins are engineered, so that the particular number and shape of the fins as illustrated are merely one of many design choices. The fins could further be oriented at different angles relative to the axis of the pipeline.

Figure 2:
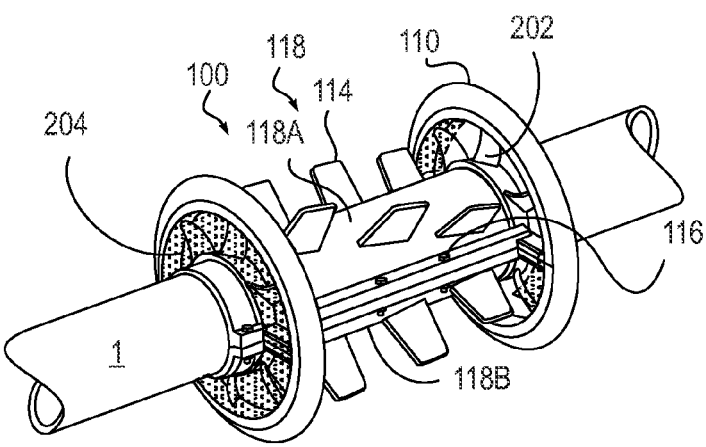
FIG. 2 is an illustration of another exemplary movement resistor.

FIG. 2 illustrates another embodiment of a movement resistor 100 installed on a conduit 1 in which the resistor portions 110 are designed to allow water to pass there through, thus draining and consolidating the soil in the seabed 3 adjacent a face of the resistor portion 110 when a generally axial force is applied, thus increasing the amount of resistance to axial displacement that the soil can provide. This can have the effect of resisting axial and/or lateral movement of the resistor portions 110 and therefore also of the conduit 1.

The resistor portions 110 shown in FIG. 2 include a structural frame 202 and at least one mesh layer 204. The mesh layer can be a mesh, screen or other device allowing water passage for soil drainage upon movement of the device through the surrounding soil.

Figure 3:
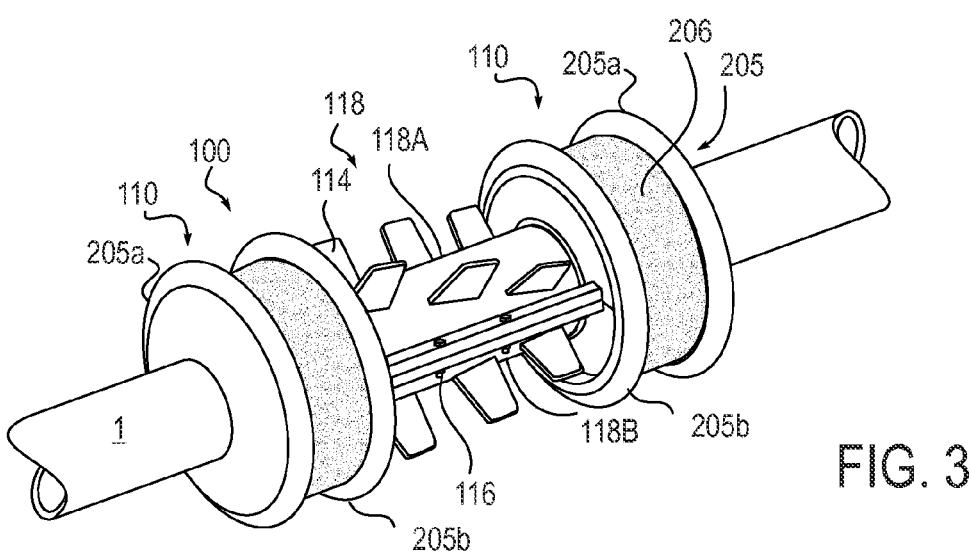
FIG. 3 is an illustration of another exemplary movement resistor.

FIG. 3 illustrates another embodiment of a movement resistor 100 installed on a conduit 1 in which the resistor portions 110 include a porous synthetic resilient material 206 attached to and sandwiched between rigid end pieces 205a and 205b. The porous synthetic resilient material 206 can be a sponge or foam material made from a highly resilient, highly durable polymer. When a force is applied to one of the outer end pieces 205, e.g., 205a, the resilient material 206 acts like a spring to absorb the force and reduce movement. In order for the resilient material 206 to absorb the force applied to the end piece 205a without transmitting the force to the conduit 1, the end piece 205a and the resilient material 206 are not fixedly attached to the conduit 1, allowing 205a and 206 to move with respect to the conduit. The other end piece 205b (attached to the resilient material 206) and the sleeve 118 are fixed to the conduit 1, so that they cannot move with respect to the conduit. The skilled artisan will appreciate that there may be several alternative ways of accomplishing this. For example, end piece 205b can be bolted to or integral to sleeve 118.

Figure 4:
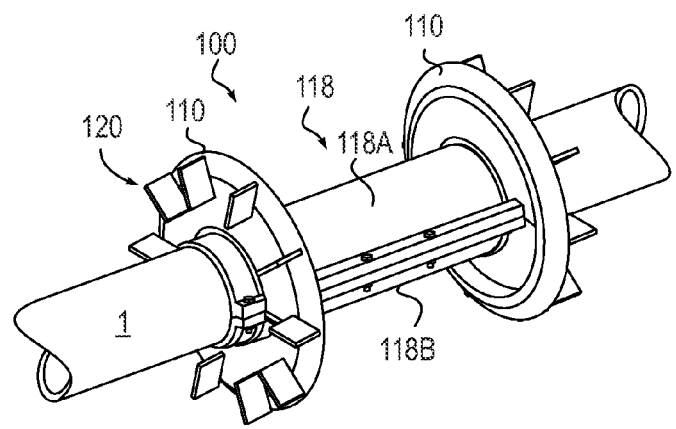
FIG. 4 is an illustration of another exemplary movement resistor.

FIG. 4 illustrates another embodiment of a movement resistor 100 installed on a conduit 1 in which the resistor portions 110 include axial fins 120 protruding axially from the face of the resistor portions 110. In the embodiment shown, optional fins 114 do not protrude from the sleeve 118. In various embodiments, the axial fins 120 can protrude from either or both faces of the resistor portions 110. In this embodiment, when force is applied to a resistor portion 110, the axial fins 120 engage with the adjacent soil in the seabed to increase the axial and/or lateral resistance of the device.

Figure 5:
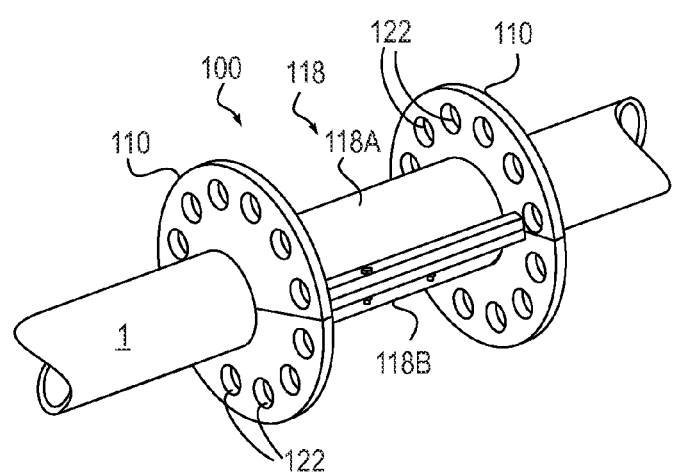
FIG. 5 is an illustration of another exemplary movement resistor.

FIG. 5 illustrates another embodiment of a movement resistor 100 installed on a conduit 1 in which the resistor portions 110 are planar elements including perforations 122. Similar to the embodiment illustrated in FIG. 2, the perforated planar element allows water to pass there through, thus draining and consolidating the soil adjacent the resistor portions 110 when force is applied and increasing the resistance of the device to the force.

Figure 6:
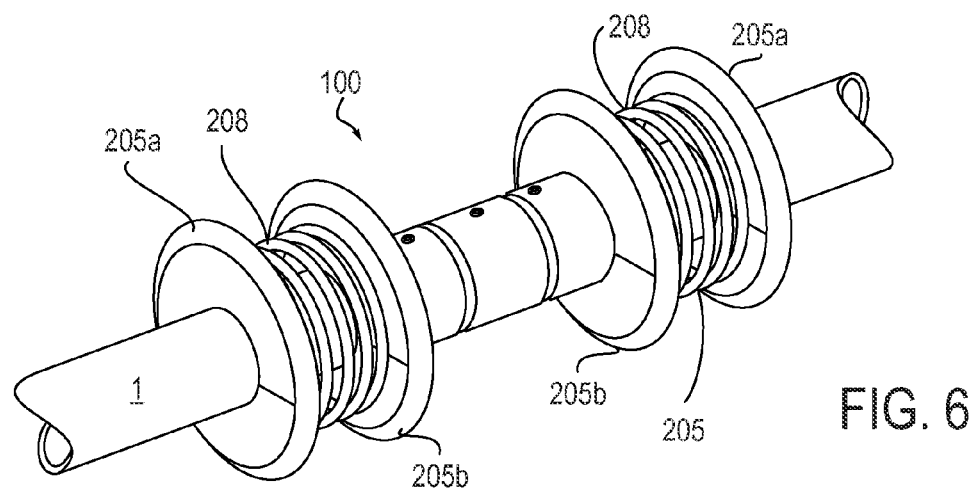
FIG. 6 is an illustration of another exemplary movement resistor.

FIG. 6 illustrates another embodiment of a movement resistor 100 installed on a conduit 1 in which each of the resistor portions 110 includes a spring 208 attached to and sandwiched between rigid end pieces 205. Similar to the sponge material 206 in the embodiment illustrated in FIG. 3, the spring 208 acts to absorb induced force applied to a face of 205. The spring allows for the loading and unloading of the forces acting on the pipeline during heating and cooling cycles during operations. The stiffness of the spring can be selected depending on the anticipated forces in a particular application. Engineering analysis can be used to predict the induced forces that may be encountered at certain locations along a pipeline, taking into account various factors including anticipated fluid temperature, pressure, soil characteristics, seabed slope, pipeline lengths and diameters, and the like. This in turn limits the tendency of the force to cause the conduit 1 to displace, e.g. in the axial and/or lateral direction. As previously described, end piece 205 and spring 208 are free to move with respect to the conduit 1, while end piece 205 is not. In one embodiment, the springs 208 can be made of a material that responds to temperature, so that the stiffness varies with temperature.

Figure 7:
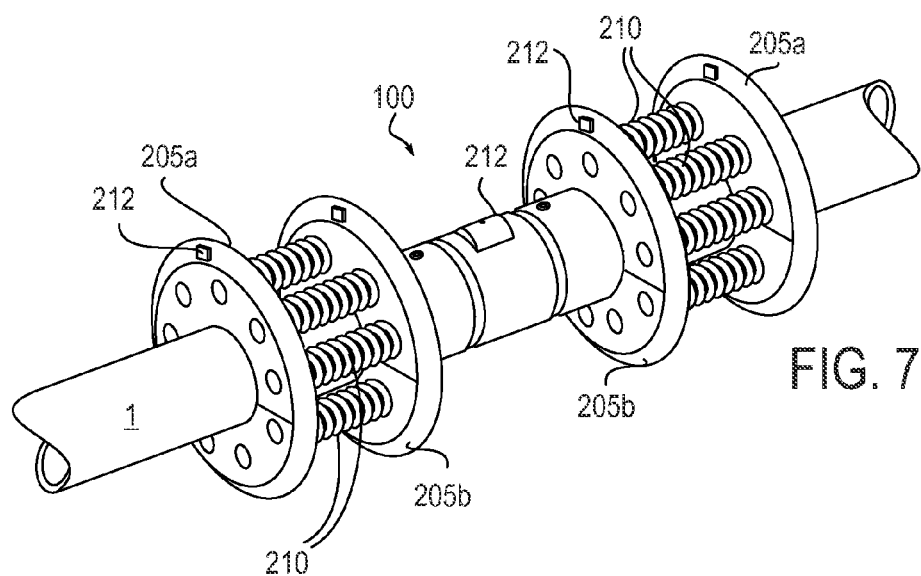
FIG. 7 is an illustration of another exemplary movement resistor.

FIG. 7 illustrates another embodiment of a movement resistor 100 installed on a conduit 1 in which each of the resistor portions 110 includes multiple springs 210 attached to and sandwiched between rigid end pieces 205. The embodiment illustrated also includes optional data handling devices 212. Data handling devices 212 can be located in the locations indicated, or in any other suitable location on the device as would be apparent to one skilled in the art. The data handling devices can be used for measuring data, storing data and communicating data. In exemplary embodiments, the data handling device 212 can be a sensor, a chip or a transmitter. The data can include displacement data, strain data, temperature data, compression data, number of events data, soil property data, water current data, time data, date data, location data and the like. The data handling device 212 can be included in any of the movement resistor embodiments disclosed herein.

Figure 8:
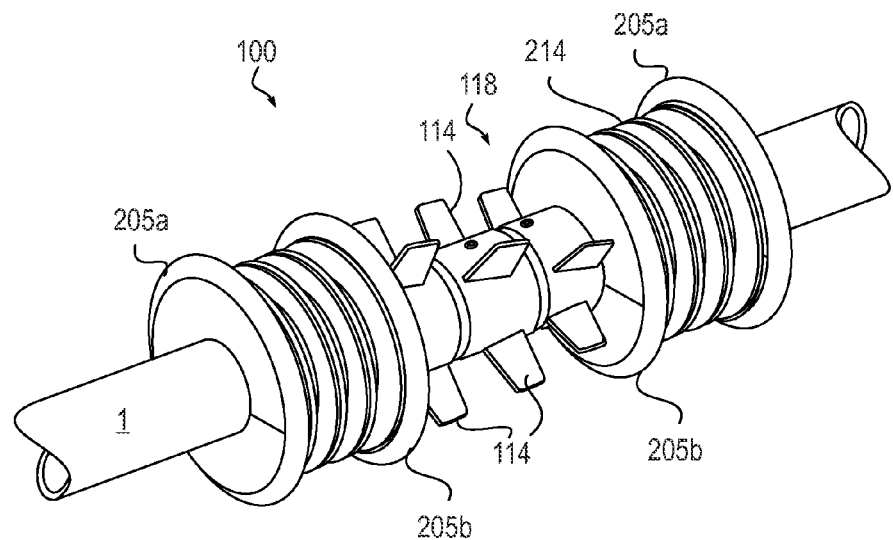
FIG. 8 is an illustration of another exemplary movement resistor.

FIG. 8 illustrates another embodiment of a movement resistor 100 installed on a conduit 1 in which each of the resistor portions 110 includes a Belleville spring 214 attached to and sandwiched between rigid end pieces 205, and fins 114 protrude from the sleeve 118.

Figure 9:
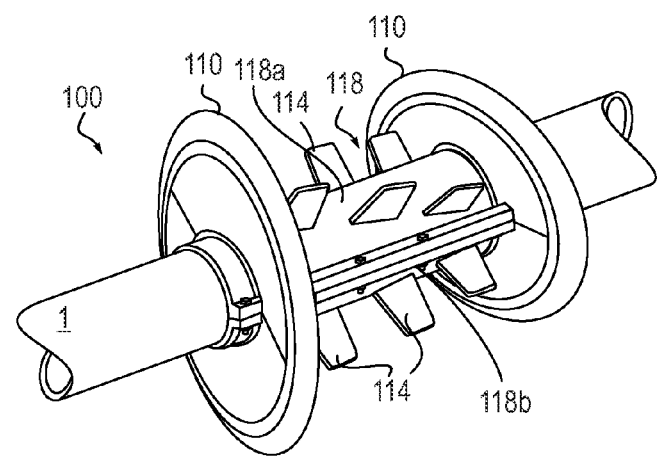
FIG. 9 is an illustration of another exemplary movement resistor.

FIG. 9 illustrates another embodiment of a movement resistor 100 installed on a conduit 1 in which at least one of the resistor portions 110 is oriented at an angle other than normal (perpendicular) to the axis of the conduit 1 so that the resistor portions 110 are not parallel to one another. In the embodiment shown, the cross-sectional shape of the resistor portions 110 is not circular, but rather elliptical.

Figure 10:
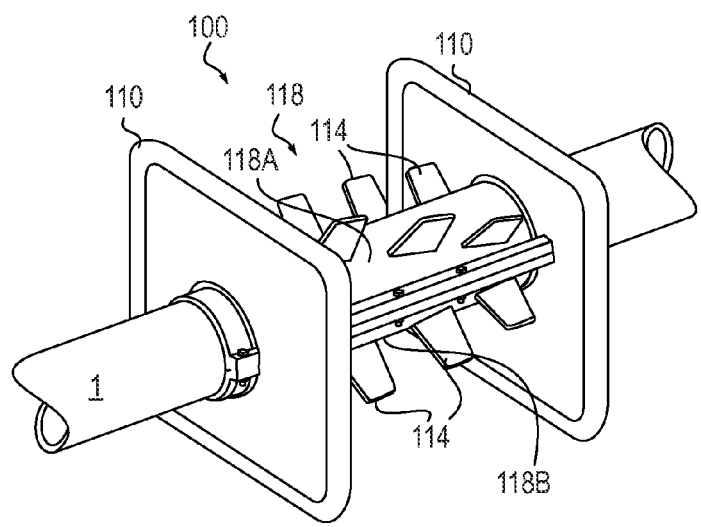
FIG. 10 is an illustration of another exemplary movement resistor.
Figure 11:
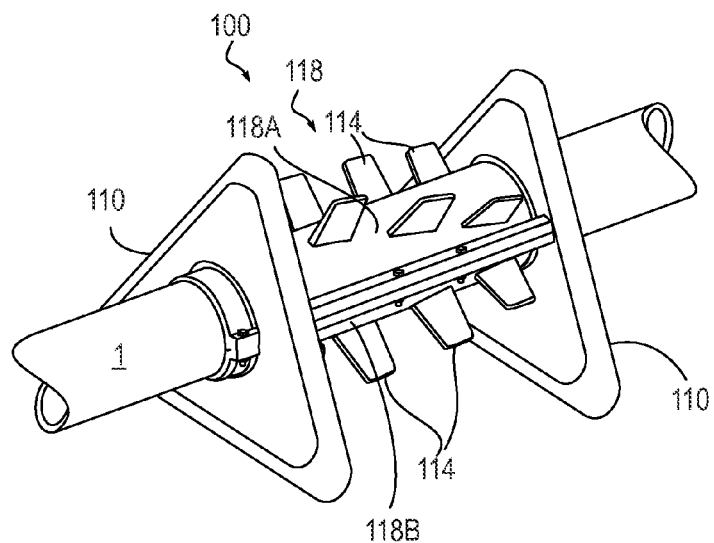
FIG. 11 is an illustration of another exemplary movement resistor.

FIGS. 10 and 11 illustrate embodiments of a movement resistor 100 installed on a conduit 1 in which at least one of the resistor portions 110 has a noncircular cross-sectional shape, i.e., a square and a triangle, respectively.

Figure 12:
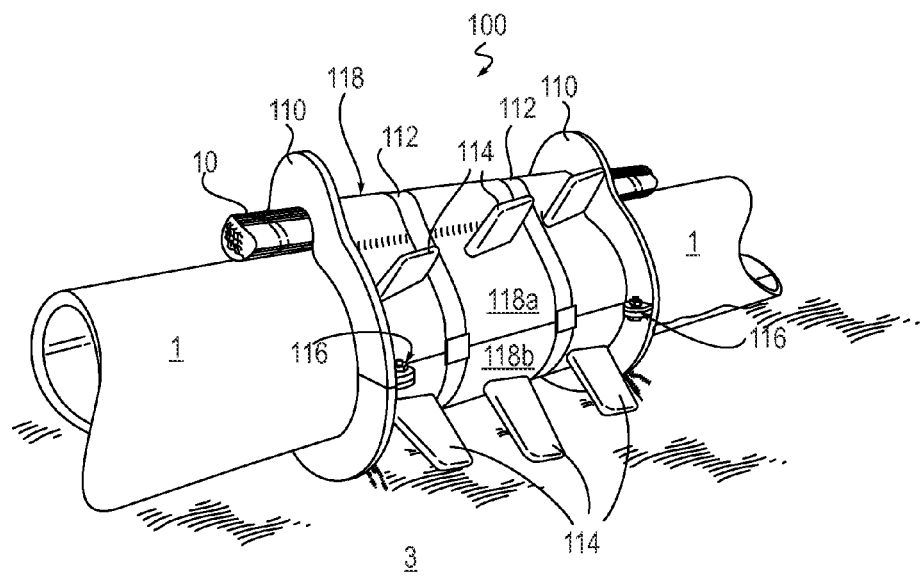
FIG. 12 is an illustration of another exemplary movement resistor.
Figure 13:
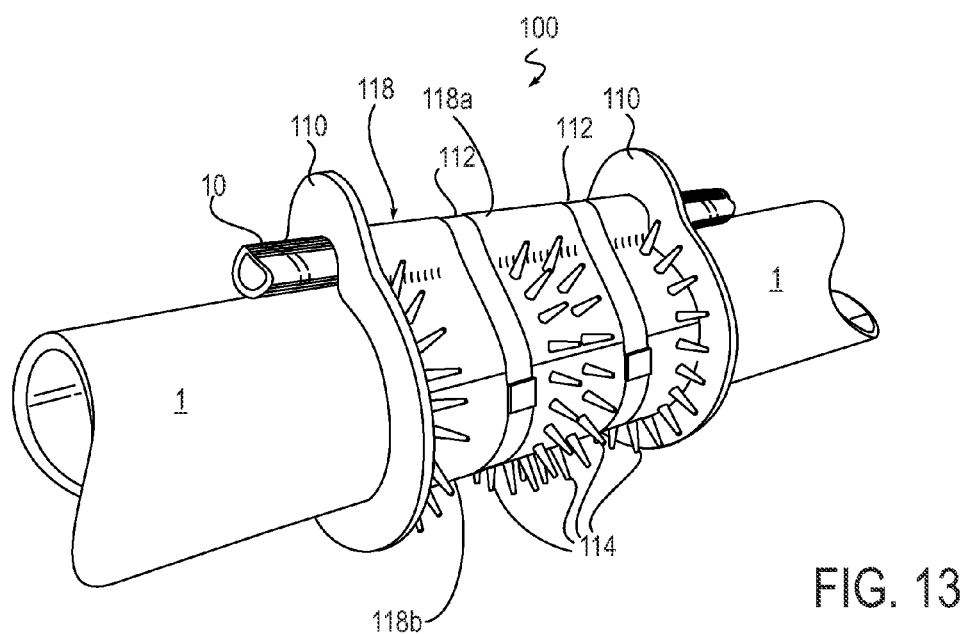
FIG. 13 is an illustration of another exemplary movement resistor.

In some embodiments, a secondary axial element 10, also referred to herein as an "axial element," can be placed adjacent the conduit 1 and held in place by the movement resistor 100. In the embodiments shown in FIGS. 12 and 13, the movement resistor 100 includes two resistor portions 110 attached at each end of a sleeve 118. The resistor portions 110 can be integral to the sleeve 118. In the embodiments shown, the movement resistor 100 is made up of two sleeve portions 118a and 118b with integral resistor portions 110, attached to one another using bands 112 and optional bolts 116. Again, the fins 114 protruding from the sleeve 118 are optional. The shape of the fins 114 illustrated in FIG. 13 differs from that shown in the other figures. The shape of the fins 114 can be determined by the skilled artisan as would be convenient and appropriate for a given application. The shapes illustrated herein are merely illustrative and not meant to be limiting.

The secondary axial element 10 can be any convenient axial element such as a cable or conduit that for practical purposes can be co-located along the length of the conduit 1. For example, the axial element can be at least one of a direct electric heating cable, an umbilical cable, a power cable and a secondary pipeline.

Figure 15:
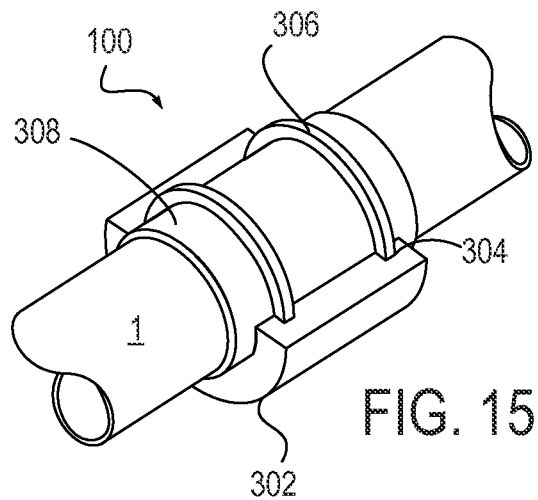
FIG. 15 is an illustration of another exemplary movement resistor.

FIG. 15 illustrates another embodiment of a movement resistor 100 installed on a conduit 1 in which the movement resistor 100 includes a single resistor portion 302 having internal grooves 304 for mounting on sleeve 308 by means of bearings 306. The resistor portion 302 has a cross-sectional shape including some fraction of a circle or other polygon. The bearings allow the resistor portion 302 to rotate about the sleeve 308. The device is seated on bearings to ensure rotation and thus properly landing of the movement resistor in the soil. The weight of the resistor portion is acted on by gravity so that the resistor portion 302 is pulled downward such that it is embedded in the soil in the seabed when placed in a desired location. Similarly, the weight of the resistor portion 314 in the embodiment illustrated in FIG. 18 is asymmetrically distributed about the circumference of the conduit 1.

Figure 16:
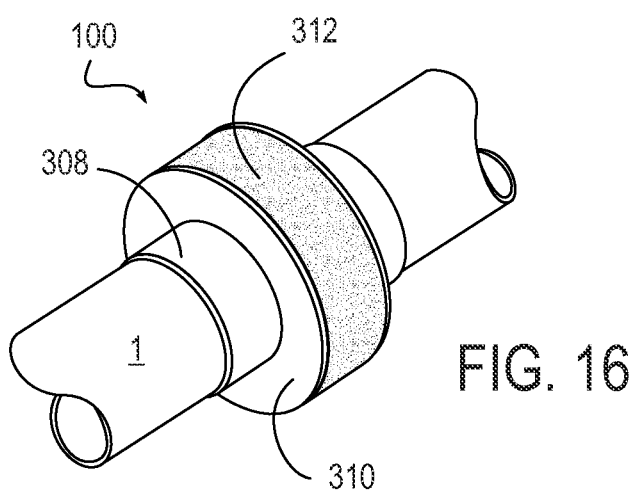
FIG. 16 is an illustration of another exemplary movement resistor.

FIG. 16 illustrates another embodiment of a movement resistor 100 installed on a conduit 1 in which the movement resistor 100 includes an engineered material 312 sandwiched and attached between two rigid end pieces 310. The sleeve 308 is securely attached to the conduit 1. One or more springs or a spring-like resilient material could be included in place of the engineered material 312.

FIGS. 17A-C are perspective, end and side views, respectively, illustrating another embodiment of a movement resistor 100 installed on a conduit 1 in which the movement resistor 100 can be a single resistor portion 314 integral to a sleeve 308 fixed on the conduit 1. In one embodiment, the device is forged into the shape illustrated. In another embodiment, the resistor portion 314 is welded to sleeve 308, resulting in bead 316.

FIGS. 18A-C are perspective, end and side views, respectively, illustrating another embodiment of a movement resistor 100 installed on a conduit 1 in which the movement resistor 100 can be a single resistor portion 314 integral to a sleeve 308 fixed on the conduit 1. As can be seen, the resistor portion 314 can be eccentric relative to the conduit 1.

Figure 19:
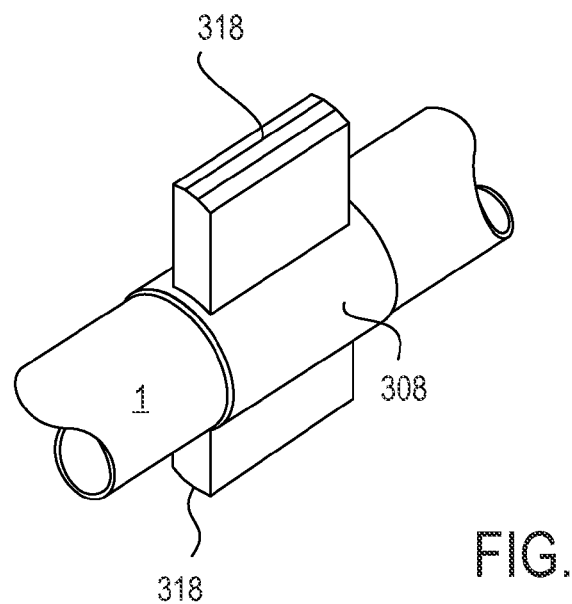
FIG. 19 is an illustration of another exemplary movement resistor.

Various alternative cross-sectional shapes for the resistor portion 314 may be suitable. The embodiment illustrated in FIG. 19 has two bars 318 radially protruding from the sleeve 308. More than two bars 318 can optionally be included.

Figure 20:
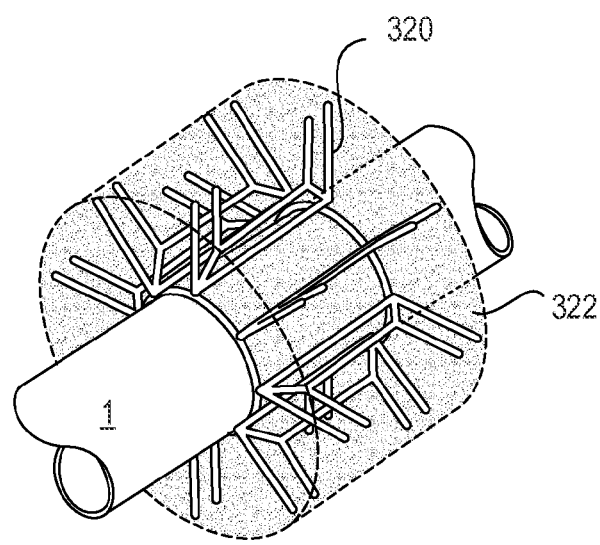
FIG. 20 is an illustration of another exemplary movement resistor.

The resistor portion 110 of the movement resistor 100 can include an engineered material 322 reinforced with an internal structural reinforcement 320, also referred to as structural stiffening elements, as illustrated in FIG. 20. The internal structural reinforcement can be steel rebar, as shown, or internal gussets, for example. In some embodiments, the movement resistor 100 can include external structural reinforcement or stiffening elements. For example, external rigid surfaces of the resistor section can be steel plated.

Figure 14:
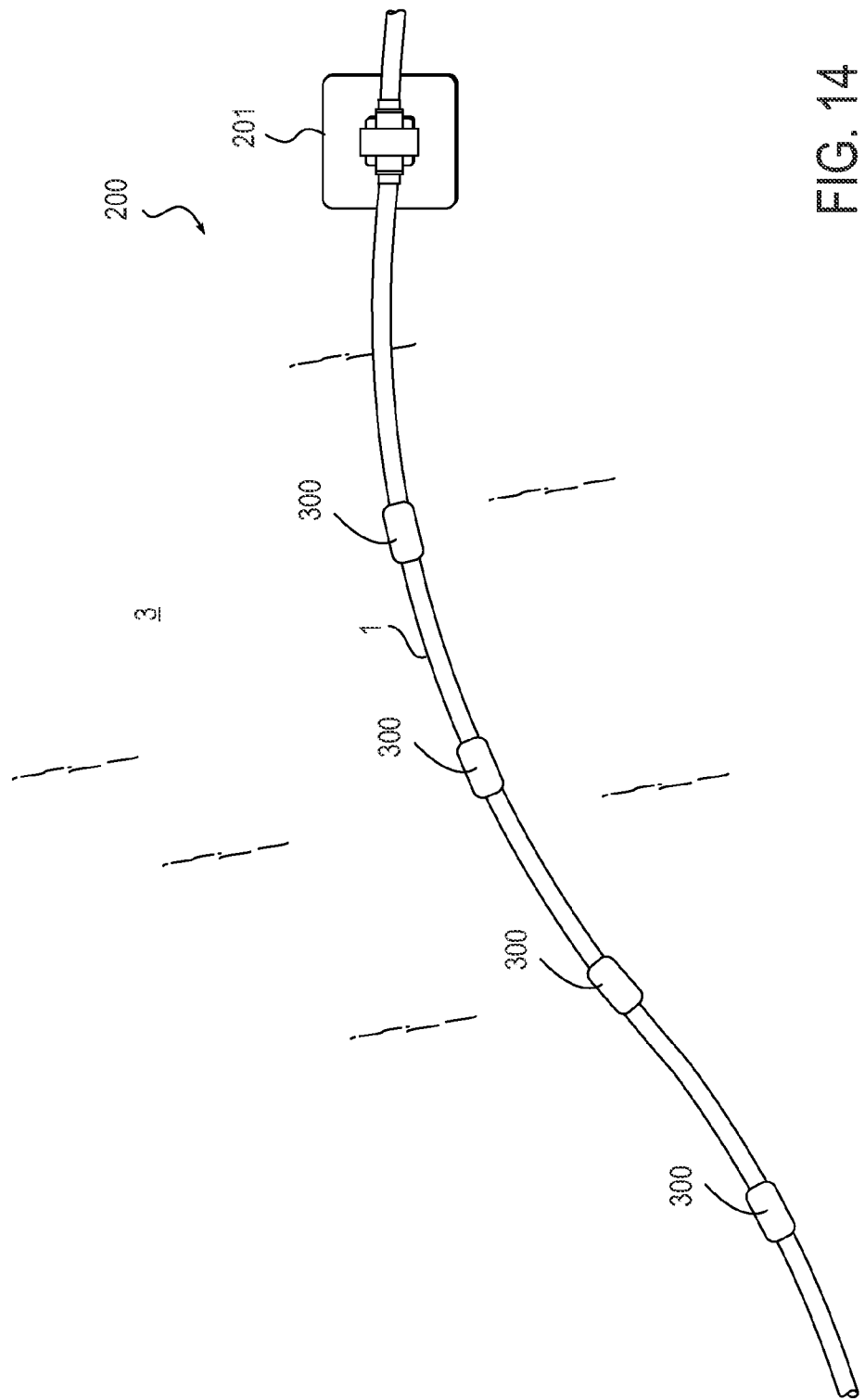
FIG. 14 is an illustration of an exemplary pipeline system including sections of movement resistors along the length thereof.

FIG. 14 illustrates an embodiment of a system 200 including a subsea conduit 1 located on the seabed 3 and having movement resistor sections 300 along the length thereof. The system may include a pipeline end termination (PLET) 201 as well as other pipeline system components as would be apparent to one skilled in the art. Each movement resistor section 300 can include at least one movement resistor 100, and may include multiple movement resistors, installed on the conduit 1. The number of movement resistors as well as the location of the movement resistor sections 300 can be determined by engineering analysis of the pipeline system. In one embodiment, the fluids conveyed within the conduit 1 are from hydrocarbon production at a temperature between about 80° C. and about 200° C. The location of the movement resistors with respect to each other can be in clusters, isolated, occurring at regular or irregular intervals, or a combination thereof. These movement resistors can be installed onto the conduit system prior to or after the conduit system goes into operation.

Unless otherwise specified, the recitation of a genus of elements, materials or other components, from which an individual component or mixture of components can be selected, is intended to include all possible sub-generic combinations of the listed components thereof. Also, "comprise," "include" and its variants, are intended to be non-limiting, such that recitation of items in a list is not to the exclusion of other like items that may also be useful in the materials, compositions, methods and systems of this invention.

From the above description, those skilled in the art will perceive improvements, changes and modifications, which are intended to be covered by the appended claims.

What is claimed is:

1. A movement resistor adapted to be installed on a subsea conduit having an axis, the movement resistor comprising:
   a. a sleeve having two ends, a sleeve diameter and an inner sleeve surface adapted to receive and securely attach to a subsea conduit; and
   b. a pair of resistor portions for resisting forces applied thereto wherein each of the resistor portions is attached at one of the two ends of the sleeve, respectively, and extends radially from the sleeve and wherein each of the resistor portions comprises at least one spring element therein;

wherein the at least one spring element is selected from the group consisting of coil springs, compression springs, machined springs and Belleville springs and is capable of being compressed in length by a distance and in a direction substantially parallel to the axis of the subsea conduit as a result of a force applied to each of the resistor portions such that when compressed, each of the resistor portions exerts a force proportional to the distance the at least one spring element is compressed in a direction substantially parallel to the axis of the subsea conduit.

2. The movement resistor of claim 1, wherein each of the resistor portions has a cross-sectional shape comprising a shape selected from the group consisting of ellipses, polygons, partial ellipses, partial polygons and combinations thereof.

3. The movement resistor of claim 1, wherein the sleeve comprises at least two elements attachable to one another using at least one of a clamp, a circumferential band, polymer material, a hinge mechanism and a bolt.

4. The movement resistor of claim 1, further comprising at least one data handling device located in the movement resistor for at least one of measuring data, storing data and communicating data.

5. The movement resistor of claim 4, wherein the data is selected from the group consisting of displacement data, strain data, temperature data, compression data, number of events data, soil property data, water current data, time data, date data and location data.

6. A system for conveying fluids on a seabed, the system comprising:
 a. a conduit having an axis located on a seabed; and
 b. at least one movement resistor installed on the conduit, the movement resistor comprising:
  i. a sleeve having two ends, a sleeve diameter and an inner sleeve surface securely attached to the conduit in a fixed position with respect to the conduit; and
  ii. at least one resistor portion having a cross-sectional shape for resisting a force applied thereto, wherein the at least one resistor portion is attached to and extends radially from the sleeve and wherein the at least one resistor portion comprises at least one spring element therein;
   wherein the at least one spring element is capable of being compressed in length by a distance and in a direction substantially parallel to the axis of the subsea conduit as a result of a force applied to the at least one resistor portion such that when compressed, the at least one resistor portion exerts a force proportional to the distance the at least one spring element is compressed in a direction substantially parallel to the axis of the conduit.

7. The system of claim 6, wherein multiple movement resistors are installed on the conduit at locations determined by engineering analysis to resist movement.

8. The system of claim 6, further comprising at least one data handling device located in at least one of the at least one movement resistor for at least one of measuring data, storing data and communicating data.

9. The system of claim 8, wherein the data is selected from the group consisting of displacement data, strain data, temperature data, compression data, number of events data, time data, soil property data, water current data, date data and location data.

10. The system of claim 6, wherein the inner sleeve surface is bonded to the conduit.

11. The system of claim 6, wherein the sleeve comprises at least two elements attachable to one another using at least one of a clamp, a circumferential band, polymer material, a hinge mechanism and a bolt.

12. A method for controlling displacement of a subsea conduit located on a seabed, the method comprising:
 a. installing at least one movement resistor on a subsea conduit having an axis, the movement resistor comprising:
  i. a sleeve having two ends, a sleeve diameter and an inner sleeve surface securely attached to the subsea conduit in a fixed position with respect to the conduit; and
  ii. a pair of resistor portions for resisting forces applied thereto wherein each of the resistor portions is attached at one of the two ends of the sleeve, respectively, and extends radially from the sleeve and wherein each of the resistor portions comprises at least one spring element therein;
   wherein the at least one spring element is capable of being compressed in length by a distance and in a direction substantially parallel to the axis of the subsea conduit as a result of a force applied to each of the pair of resistor portions such that when compressed, each of the pair of resistor portions exerts a force proportional to the distance the at least one spring element is compressed in a direction substantially parallel to the axis of the subsea conduit.

13. The method of claim 12, wherein the at least one movement resistor is installed in at least one location determined by engineering analysis.

14. The method of claim 12, wherein the sleeve comprises at least two elements attachable to one another; and
 the at least one movement resistor is installed by placing the at least two elements around the subsea conduit and attaching the at least two elements to one another using at least one of a clamp, a circumferential band, polymer material, a hinge mechanism, and a bolt.

15. The method of claim 12, wherein the at least one movement resistor is installed by bonding the inner sleeve surface to the subsea conduit.

16. A method for installing a subsea conduit on the seabed comprising:
 a. installing at least one movement resistor on a conduit having an axis; and
 b. laying down the conduit on the seabed;
  wherein the movement resistor comprises:
  i. a sleeve having two ends, a sleeve diameter and an inner sleeve surface securely attached to the conduit in a fixed position with respect to the conduit; and
  ii. at least one resistor portion having a cross-sectional shape for resisting a force applied thereto, wherein the at least one resistor portion is attached to and extends radially from the sleeve and wherein the at least one resistor portion comprises at least one spring element therein;
   wherein the at least one spring element is capable of being compressed in length by a distance and in a direction substantially parallel to the axis of the subsea conduit as a result of a force applied to the at least one resistor portion such that when compressed, the at least one resistor portion exerts a force proportional to the distance the at least one spring element is compressed in a direction substantially parallel to the axis of the subsea conduit.

* * * * *